Patented Nov. 20, 1945

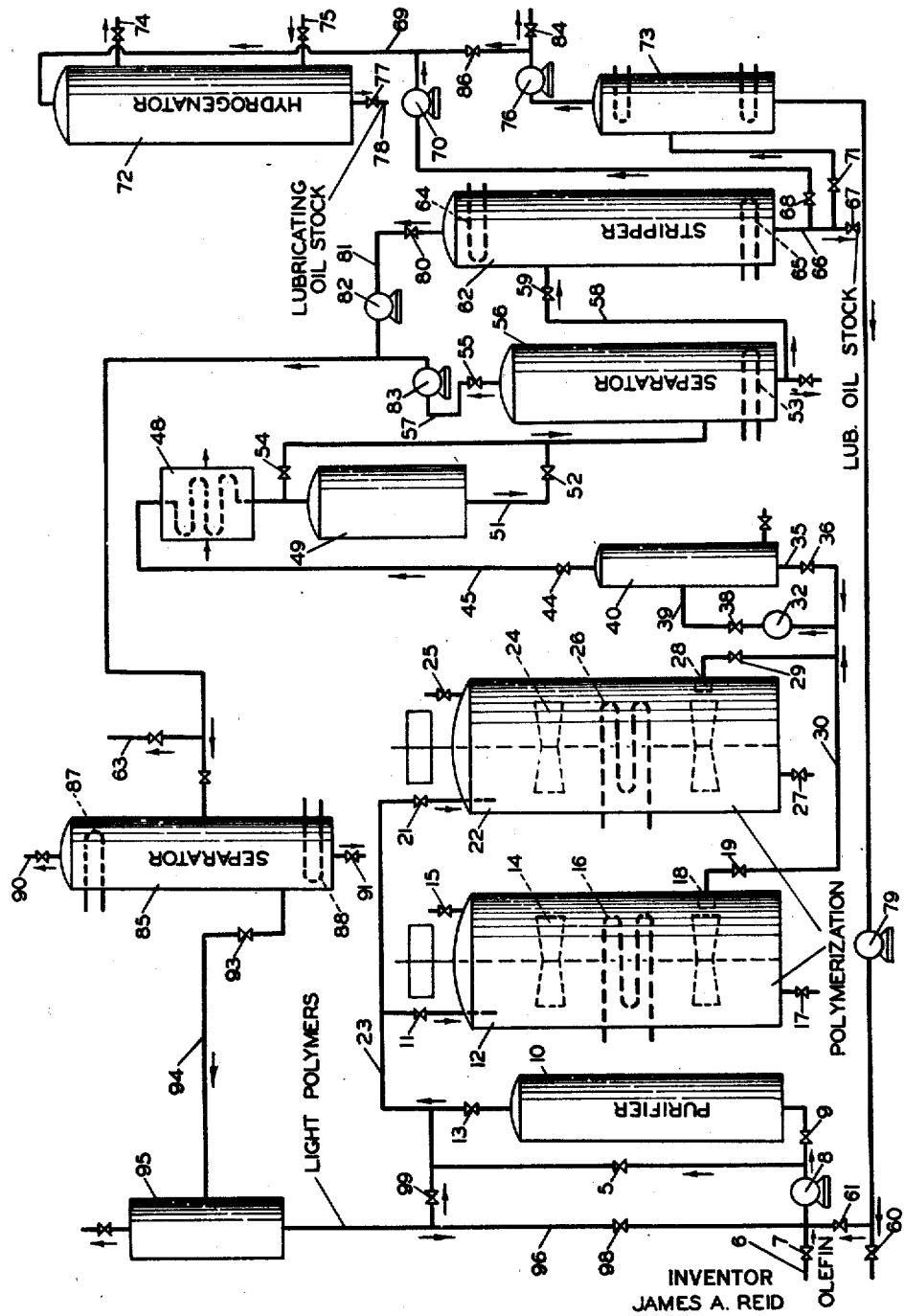

2,389,240

UNITED STATES PATENT OFFICE 2,389,240

PROCESS FOR THE CONVERSION OF HYDROCARBONS

James A. Reid, Bartlesville, Okla., assignor to Phillips Petroleum Company, a corporation of Delaware Application November 7, 1940, Serial No. 364,721

5 Claims. (Cl. 260—683.15)

This invention relates to the polymerization of olefin hydrocarbons, especially to the polymerization of low boiling olefins to form simple viscous polymers suitable for use for, or as bases for, lubricating oil. In particular it relates to the polymerization of olefin hydrocarbons in a catalytic system containing a zirconium tetrahalide to produce oils in a desired viscosity range. It further relates to the polymers so produced.

This invention relates to conversion of relatively low boiling olefin hydrocarbons to produce hydrocarbons for use as, or as basis for, lubricating oils.

More particularly the invention relates to the conversion of relatively low boiling olefins in the presence of certain catalysts to produce oils in a desired viscosity range.

Under proper conditions, many of the metal halides which have relatively low boiling points, and which are decomposed in the presence of water by hydrolysis, are catalysts for the polymerization of olefin hydrocarbons to form compounds of higher molecular weight. Through the utilization of selected catalysts and conditions for polymerization, products ranging in characteristics from gasoline through the more viscous oils to resinous and rubber-like products may be produced from any particular olefin as well as from a wide variety of olefin-containing charge stocks.

In addition to being catalysts for the polymerization of olefin molecules to form compounds of higher molecular weights, many of the readily hydrolyzable metal halides are also catalysts for other reactions, which may occur concomitantly. One such reaction is the isomerization of aliphatic olefins to produce cycloparaffins having the same number of carbon atoms per molecule; another is the splitting of the olefin molecules into hydrocarbons of lower molecular weights, frequently with the formation of hydrocarbons both more saturated and more unsaturated than the original olefins. Some catalysts of this type promote the union of the olefin hydrocarbons with other hydrocarbons, such as aromatic or paraffin hydrocarbons thereby forming non-olefin hydrocarbons of higher molecular weight by alkylation. In the polymerization of olefins with some of the metal halide catalysts, for example aluminum chloride, it appears that a complex compound of the olefin and the metal halide is formed, and after an appreciable period of use for polymerization a substantial proportion of the hydrocarbon material remains combined with the catalyst as a sludge or oily or pasty mass, thus diminishing the yield of desired oil or other product from the reaction, and ultimately resulting in a deactivation of the catalyst. The extent and influence of these secondary reactions on the properties of the polymer increase with increase in the molecular weight of the product; thus in the manufacture of viscous polymers such as may be used as or in lubricating oils, the control of such secondary reactions is important. In these processes for manufacture of lubricating oils and bases from olefin hydrocarbons, the secondary reactions are undesirable in that they decrease the quality, the uniformity, and the yield of product and increase the manufacturing costs.

I have discovered that the use of zirconium tetrahalides, especially the tetrachloride and tetrabromide, as catalysts for the polymerization of olefins, preferably in a system including recycle of partially converted and/or over converted olefins, permits the production of a high yield of desirable products, particularly of stable paraffinic-base oils useful in the manufacture of lubricating oils. The higher molecular weight products appear to be simple olefin polymers, and they are produced with a minimum of side reactions, such as cyclization. In general, polymers of all or in a wide range of molecular weights and viscosities are produced, but with a proper control of reaction temperature as will be more fully discussed hereinafter, combined with recycle of undesired fractions as will also be further discussed, polymer fractions within any one of many desirable ranges of characteristics may be obtained in high yields. I have also found that many olefin-containing hydrocarbon materials produced from naturally occurring sources contain deleterious, non-olefin, reactive materials which need to be removed for successful operation. Such polymer fractions as are produced by my invention may be used as lubricants as such, may be saturated by nondestructive hydrogenation to produce lubricants having substantially the same physical characteristics but greater stability, or may be used to alkylate aromatics to form stable lubricants having different characteristics, as will be more fully discussed. They may be used alone, blended with other lubricants, or may have various additives blended with them.

It is an object of this invention to polymerize olefins to form polymers in the molecular weight, or viscosity, range of lubricating oils and possessing great resistance to sludge formations and deterioration.

Another object of my invention is to establish an olefin polymerization process which is so controlled that the viscosity of the product may be accurately controlled as desired.

It is further an object of this invention to convert olefin hydrocarbons to lubricating oils without loss of hydrocarbon material through formation of sludge or other undesired products.

A further object of this invention is to polymerize olefins to desired polymers in the lubricating oil range in the presence of a zirconium tetrahalide.

Another object of this invention is to convert aliphatic olefin hydrocarbons to polymeric compounds without the occurrence of cyclization or ring closure, the union of olefin and paraffin, or degradation of any of the polymeric compounds in the system.

Still another object of this invention is to polymerize olefin hydrocarbons to stable lubricating oils by means of catalysts which maintain their activity over long periods of time and which may be separated from the product substantially unchanged at the completion of the reaction.

Further objects and advantages of this invention will be evident to one skilled in the art from accompanying disclosure and discussion.

Ipatieff, in his book "Catalytic Reactions at High Pressures and Temperatures," has described the use of zirconium chloride as a catalyst for the polymerization of propylene at room temperature. The product contained about 60 per cent of polymers which boiled above 530° C. (986° F.) and were too viscous for use as a lubricant for an internal combustion engine.

I have found that not only will zirconium chloride act to polymerize olefins to form extremely viscous oils, but also that under certain conditions the molecular weight, boiling range, or viscosity of the product resulting from the polymerization of olefins with a zirconium tetrahalide catalyst, particularly zirconium tetrachloride and tetrabromide, can be so controlled that little or no polymer more viscous than that desired is produced, and that a high proportion of the olefin charge is converted to polymers within a controlled and desired range of molecular weight or viscosity. I have also found that such a catalyst, when used in the process hereinafter described, results in the production of a high yield of products possessing more desirable qualities than result from the use of other catalysts, such as aluminum chloride, in the system. Although Ipatieff states that zirconium chloride is very similar to aluminum chloride in catalytic action except that its velocity of polymerization is less, I have discovered that under the conditions more fully discussed hereinafter, zirconium tetrachloride differs materially in its catalytic action from aluminum chloride in several important respects, especially when employed in the polymerization system hereinafter disclosed. Thus, as previously mentioned, I have found that zirconium tetrahalides do not promote cyclization reactions of olefins, or alkylation reactions between paraffins and olefins, to more than a very slight or negligible extent, in contrast with aluminum chloride or bromide, which do promote such reactions rather extensively at the reaction temperatures disclosed herein. I have further found that I may control the viscosity range of the product by carefully controlling the reaction temperature, so that the same or similar charge stocks can be made to produce simple olefin-polymer oils having different viscosity ranges, and also so that oils having the same viscosity ranges can be produced from different charge stocks. I have found that I can recycle polymer fractions having too low viscosities, and thereby increase the yield of the desired product, and also that I can recycle polymer fractions which have too high viscosities and likewise increase the yield of desired product. By a judicious combination of two or more of these features I find that I am able to produce high yields of desired polymer fractions in the lubricating oil range, with very little waste material, from wide ranges of charge stocks. While my invention relates broadly to zirconium tetrahalides, I prefer to use zirconium tetrachloride or tetrabromide.

The accompanying drawing which forms a part of this specification represents diagrammatically one arrangement of apparatus for the production of polymers of olefins according to the present invention.

Referring now to the drawing, an olefinic hydrocarbon material is introduced into the system through pipe 6, either in a pure state or in admixture with a low-boiling non-reactive diluent such as a paraffin hydrocarbon. When such olefins are produced by dehydrogenation, they will generally be accompanied by at least a certain amount of the unreacted paraffins. Incompletely converted or unreacted hydrocarbons in the effluent from the reaction are led through pipe 96 and valve 98 to pipe 6 to be recycled through the system. The charge is forced by pump 8 preferably through valve 9 and dehydrator or purifier 10 into manifold 23. From the manifold the charge is admitted through valve 11, or 21, with or without preheating, to a reaction zone such as reactor 12, or 22, respectively. In the reactor the charge, containing olefin hydrocarbons, is contacted by means of agitator 14, or 24, with the solid zirconium tetrahalide which is introduced as a powder, or a suspension in an inert liquid or the like, through valve 15, or 25. The agitation is continued throughout the reaction so as to keep the catalyst suspended in the mixture. The temperature of the reacting mixture is controlled as desired by means of coil 16, or 26. The pressure in the system is established by the vapor pressure of the mixture in the reactor. At the completion of the reaction, or after a suitable reaction period, the product is withdrawn from reactor 12, or 22, through filter 18, or 28, respectively, which separates most of the catalyst from the oil and retains it in the reactor for further use. From the filter 18, or 28, the polymer and diluent is conducted through valve 19, or 29, into manifold 30, through which the hydrocarbon mixture, which may contain traces of catalyst and other acidic materials, is conducted to mixer 32, where it is agitated with an alkaline solution withdrawn from settling tank 40 through pipe 35 and valve 36. Following neutralization and removal from the oil of any acidic materials, the mixture of alkaline solution and oil is conducted from mixer 32 through valve 38 and pipe 39 to settling tank 40 in which complete separation of the hydrocarbon and the aqueous solution is obtained. The hydrocarbon mixture then passes through valve 44 and pipe 45 to preheater 46, where the temperature of the oil is increased to a value in the range of about 150 to 300° C. (302 to 572° F.), preferably 180 to 210° C. (356 to 410° F.). At this point the polymer mixture may contain traces of water and also alkyl halides, especially if tertiary olefins were present in the charge stock. In order to prevent degradation of the product or corrosion of equipment in such cases, the heated hydrocarbon mixture may be passed through tower 49 which contains a material suitable for reacting with and removing the water and alkyl halides, such as soda ash, alkaline clays, a mixture of bauxite and soda ash; or the like. The mixture of olefins and paraffins is conducted through pipe 51 and valve 52 to separator 56. The temperature of the liquid in the separator is maintained at a value in the range of about 200° C. (392° F.) by means of heater 53, and by means of pump 83 the pressure in the separator is maintained at a low value, such as between 5 and 20 pounds per square inch absolute. Under these conditions any low-boiling diluent and some of the partially converted and/or unreacted olefin material is separated and withdrawn from the residue through pipe 57. The residue which is not vaporized under these conditions is withdrawn from separator 56 through pipe 58 and the flow into fractionator 62 is controlled by means of valve 59. The pressure in the fractionator 62 is preferably maintained at less than one pound per square inch absolute, the temperature is controlled by heater 65 and heat extraction and condensing means 64, and the fractionator is equipped with suitable bubble-trays, or the like, not shown. Through control of pressure and temperature, the volatile components of the polymer mixture are distilled, leaving a residual oil which is removed from the fractionator through pipe 66. This polymer fraction may be recovered as such by removing it from the system through valve 67. If desired it may be saturated with hydrogen by being passed through valve 68, pump 70 and pipe 69 to hydrogenation apparatus 72. The hydrogenation may be accomplished at a temperature of about 150 to 200° C. (302 to 392° F.), while in contact with a gas containing free hydrogen introduced through pipe 75, a simple saturation of olefinic bonds, without scission reactions, being the predominant reaction. Excess gas may be removed through pipe 74, and the saturated product is recovered through pipe 78 and valve 77. In many instances the material withdrawn through pipe 66 is suitable as the final product. However, at times it will be found desirable not to include the heaviest polymers in the final product, in which case the material passing through pipe 66 may be passed through valve 71 to fractionating means 73. The material entering means 73 is fractionated at a low pressure to separate an overhead product in the lubricating oil range and a heavier kettle product. The low pressure may be obtained by vacuum pumps 76 and 79, or the like. Steam distillation or the like, carried out with the aid of additional conventional equipment not shown, may also be used, alone or in conjunction with a low total pressure. The overhead product can be recovered and removed from the system through valve 84, or may be passed through valve 86 to pipe 69 and the hydrogenating system 72 just described. The heavier kettle product can be removed from the system through valve 60, or may be returned wholly or in part to the polymerization part of the system through valve 61 to pipe 6.

The diluent and partially polymerized olefin hydrocarbon material are forced by pumps 82 and 83 into separator or fractionator 85, wherein such conditions of temperature and pressure are established that those portions of the mixture which are not useful as recycle stocks, such as the diluent and/or light, inert hydrocarbons are removed through pipe 90. The selected recycle stock, consisting principally of polymers of low viscosity and/or unreacted olefins, is then withdrawn from separator 85 through valve 93 and pipe 94 and transferred to supply tank 95, from which it is introduced into the charge stream through pipe 96 for further polymerization as previously mentioned. If desired all or any part of this light material passing through pipes 57 and 81 may be withdrawn from the system through pipe 63.

Many variations in the apparatus or operation of this process may be desirable in specific embodiments. More than the two reactors may be useful or only a single one may be used. A volatile diluent may be evaporated from liquid reaction mixtures in reactors 12 or 22 to aid in control of temperature during polymerization. If desired a tube coil reactor may be used, with suitable apparatus for effecting the physical removal of suspended catalyst, with recycle of a part or portion of it. A solid alkaline material may be employed in place of the alkaline solution mixing and settling system 32 to 40, for removing small amounts of catalyst and other acidic material from the mixture. Light olefinic products may be removed directly, by means not shown, from stripper 62 as the source of hydrocarbons possessing very specific qualities. Steam may be used in the stripper 62 to aid in the stripping of low-viscosity polymers from the oil. The proportion of product to total polymer separated in stripper 62, and the proportion of diluent and other materials removed from the system in separator 85 may be varied at will, depending upon the charge, the polymerization conditions, and the product desired. Concurrent, countercurrent, or other systems of flow may be utilized in the non-destructive hydrogenation.

The materials which may be utilized as charge stocks for this system include the aliphatic olefins which contain three or more carbon atoms per molecule. These olefins may be obtained in a relatively pure state by dehydration of the appropriate alcohols, dehydrogenation of the corresponding paraffins, depolymerization or cracking of heavier polymers or olefins, or the like. On a commercial scale, the olefins are preferably manufactured by dehydrogenation of paraffin hydrocarbons. The low boiling olefins such as propylene and isobutylene may be prepared by thermal treatment of paraffin hydrocarbons, as well as by catalytic dehydrogenation. Higher molecular weight olefins may be prepared either by thermal treatment of the paraffins, resulting in the production of olefins most of which possess shorter carbon chains than the original paraffin, or by catalytic dehydrogenation of higher hydrocarbons with the formation of olefins having predominantly the same number of carbon atoms in the molecule as the original paraffins. Selected fractions of olefin-containing refinery products, such as the products from cracking stills, may also be used as charge stocks.

I have found that moisture, most oxygen compounds such as alcohols and ethers, sulfur compounds, such as mercaptans and thiophene, alkaline nitrogen compounds and in some cases compounds containing halogens in the charge to the reaction system tend to deactivate the zirconium halide catalyst and also to alter adversely the characteristics, quality, and yield of the desired product in this catalytic system. The substantial absence of these compounds from the charge mixture is essential to satisfactory operation of the process, so that in most cases it will be necessary to use some means such as purifier 10.

The polymerization of olefins in connection with my invention is also performed in the substantial absence of aromatic hydrocarbons, since union of the olefins and aromatics occurs under the conditions of polymerization just described. Other types of compounds than paraffinic or other non-cyclic hydrocarbons result from reaction in a system containing aromatic hydrocarbons. The diolefins such as butadiene are also undesirable in the charge stock, as they cause a rapid deactivation of the catalyst, and other non-olefinic unsaturates should also be removed. The operation of purifier 10 will depend to a certain extent upon the contaminant which is to be removed. When the charge stock is produced by dehydrogenation, it may contain traces of diolefins or acetylenes, which can be removed by mild polymerizing agents, such as dilute mineral acids, fuller's earth, bauxite, etc. Adsorbents, such as dehydrated bauxite, silica gel, activated charcoal, etc. may be used to remove many sulfur compounds, water, alcohols, ethers, and the like. With some sulfur compounds, decomposition may be a part of the removal, followed by removal of hydrogen sulfide, or similar product, by appropriate means. Halogen compounds may also be removed by adsorption, or by chemical reaction. The specific process to be used for any particular situation and the extent of removal of the impurity can be readily determined by trial, and applied, by one skilled in the art. If the charge stock does not need such purification it may be passed directly through valve 5 to manifold 23. If the recycle stream passing through pipe 96 is sufficiently pure for direct use, it may be passed through valve 99 directly to manifold 23.

A solid zirconium tetrahalide in a relatively finely divided state may be introduced into the reactors in a dry state or preferably as a suspension or slurry in a paraffinic or other inert liquid material. The use of a slurry facilitates introduction of the catalyst into the system without exposure to moisture. Used catalyst may be withdrawn continuously, or from time to time, from the bottom of the reactor, as desirable or necessary. Other known polymerizing methods wherein a catalyst is suspended in a flowing stream, or is incorporated with a solid granular support, may also be used.

The proportion of catalyst to olefin hydrocarbon in the reaction chamber may be varied, depending upon the reactivity of the olefin, the concentration of olefin in the charge, and the ease of control of the reaction temperature. The tertiary base olefins, such as isobutylene, are much more readily polymerized than the primary and secondary base olefins, such as 1- or 2-butene or 1-octene, so that much lower catalyst-hydrocarbon ratio may be employed to maintain a given polymerization rate in polymerizing the former type of olefins. Normally, from 0.1 to 10.0 pounds of catalyst per 100 pounds of olefin are charged to the reactor or are present in the reaction zone, depending to a certain extent upon the concentration and molecular weight of the olefins. Since only a relatively small proportion of the catalyst is deactivated or lost from the polymerization system, and little sludge is formed when the charge stock is properly purified, much less catalyst need be added to subsequent charges of olefin to maintain the desired concentration of catalyst. With adequate agitation and control of temperature, the reaction becomes substantially completed within a reaction period of one half to ten hours.

The proportions of polymer fractions in various viscosity ranges is dependent to a limited extent on the charge olefin, but may be controlled substantially through control of the polymerization temperature. With properly controlled reaction conditions, the higher the molecular weight of the charge stock, the greater the proportion of product in the desired range. In the production of polymers for the manufacture of lubricating oils, it is preferred to maintain the temperature of the reaction at a value between about 30 and 100° C. (86 and 212° F.) although higher or lower temperature have been used and found useful in the manufacture of oils in special viscosity ranges. The yield of a polymer fraction of low viscosity is favored by relatively high polymerization temperatures, and the yield of a polymer fraction of high viscosity is favored by relatively low polymerization temperatures. The effect of reaction time is not very pronounced, and is predominantly exhibited in the amount of original olefin reacted. Increase of reaction time increases the amount of olefin reacted, but has little effect on the character of the product. The type of product is essentially the same with 20 per cent of the olefin undergoing reaction as with 80 per cent. Even above and below these limits only slight differences tend to show up.

The effect of the temperature of polymerization on the viscosity of the product is illustrated by the data in Table I. These polymers were prepared from isobutylene by contacting the olefin in liquid phase with zirconium tetrachloride. The oil was distilled at reduced pressure to yield the two distillate and the kettle products indicated.

Table I

| Percent by volume of oil | Polymerization temperature | | | | |
|---|---|---|---|---|---|
| | 20° C. | 40° C. | 60° C. | 80° C. | 100° C. |
| Viscosity less than 90 seconds (distillate) S. U. V. at 130° F. | 8 | 22 | 44 | 60 | 82 |
| Viscosity between 90 and 300 seconds (distillate) S. U. V. at 130° F. | 12 | 21 | 25 | 23 | 14 |
| Viscosity more than 300 seconds (residue) S. U. V. at 130° F. | 80 | 57 | 31 | 17 | 4 |
| | 100 | 100 | 100 | 100 | 100 |

The decrease in proportion of viscous oil in the polymer accompanying an increase in polymerization temperature is evident, and illustrates how an optimum yield of a desired polymer fraction may be obtained by suitable correlation and control of the polymerization temperature. The non-destructive hydrogenation of these olefin polymers to paraffins has a very small influence on the viscosity of the oil.

The effect of reaction pressure on the polymerization reaction or on the products is very small at pressures between atmospheric and 500 pounds per square inch. In most instances it is satisfactory and desirable to conduct the reaction at a pressure sufficient to maintain a liquid reaction phase. It is desirable, however, to keep sufficient volatile inert material, such as propane, in the system to maintain the pressure in the reactor above that of the atmosphere when such a kettle-type reactor is used as has been shown diagrammatically in the drawing.

At the completion of the reaction, most of the zirconium tetrahalide catalyst is unchanged in activity. The catalyst may thus be separated mechanically from the converted olefin and used for the polymerization of subsequent portions of olefins, or withdrawn and recycled in continuous operations. In this way the net amount of catalyst consumed is less than 1 per cent and usually in the range 0.1 to 0.4 per cent of the olefin charged.

The substantial absence of sludge formation in a system such as the one described, using zirconium tetrachloride as the catalyst, is of value in that the active or useful life of the catalyst is greatly prolonged and the activity of the catalyst is much more uniform than in the case of sludge formation as with aluminum chloride for example. Further since no oil is lost or low-grade product is produced, the yield of desirable product from the polymerization is increased, especially in a system involving recycle of unreacted olefins and various undesired polymer fractions.

In the presence of hydrogen halides, especially in contact with ferrous metals, and at elevated temperatures such as are encountered in the distillations, some olefins have a tendency to undergo cycliaztion or other degradation reaction. Acidic materials in the recycle stock alter the activity of the polymerization catalyst, so their presence in the charge can not be permitted. The acidic materials, particularly the halogen compounds, possess a tendency to corrode the reaction vessels and equipment. Finally, these contaminants freqeuntly are poisons for the hydrogenation catalysts, or promote the production of a somewhat different product from that disclosed as most desirable. Therefore the eventual complete removal from the product, preferably before distillation or fractionation, of hydrogen halides, alkyl halides, and any other materials which are acidic or break down to yield acids is essential for the continued satisfactory practice of the present invention. The completeness of such removal and the point or points in the operation where it is carried out can be readily adapted to the requirements of the modification practiced and of the product desired.

Following the removal from the product of any acidic materials, the diluent and low-boiling components are removed in one or more operations. The pressures and temperatures used are so chosen as to separate the products as desired without excessive decomposition. Since these products decompose without the formation of solid residues, in contrast to most naturally occurring oils, the occurrence of slight decomposition is not as objectionable, as with natural oils. The temperature of appreciable decomposition varies from a value in the range of about 265° C. (509° F.) for polymers of isobutylene to about 325° C. (617° F.) for polymers of octenes.

The oil resulting from the polymerization and fractionation is found to be substantially completely olefinic, or in other words to contain one double bond per molecule, indicating the substantial absence of alkylation, cyclization or other reaction which would result in saturation of the olefinic bond. It is desirable to hydrogenate or otherwise treat the olefin polymers to increase the stability of the product, especially toward oxidation. This hydrogenation, without destruction or alteration of the carbon structure, may preferably be performed at a temperature of 140 to 200° C. (284 to 392° F.), hydrogen pressure of 50 to 2000 pounds per square inch, and in the presence of a catalytic material for promoting the union of olefin and hydrogen, such as catalysts comprising nickel, copper or copper compounds, or the platinum metals.

The olefin product may also be satisfactorily stabilized by reaction with paraffin or aromatic hydrocarbon to form a paraffin or substituted aromatic hydrocarbon by alkylation. Lubricants of various characteristics can be prepared by including such a step in the process. Alkylation of simple aromatics with these heavy olefins can be carried out with suitable alkylation catalysts known to the art.

From the low-boiling diluent and the polymer which is of lower molecular weight or viscosity than is desired in the product, at least a portion of the diluent and perhaps some low-boiling components of the effluent mixture are removed. The remaining hydrocarbon material, containing predominantly olefinic polymers of intermediate molecular weight, is recycled for further polymerization with additional fresh olefin charge. The deleterious influence of the products of the secondary reaction such as cyclization, hydrogenation-dehydrogenation, and alkylation, the formation of which is promoted through the use of some catalysts such as aluminum chloride, become increasingly important in a system of recycling. The use of a zirconium tetrahalide as a catalyst in this process has the distinct advantage of permitting multiple recycling without depreciation in quality of the desired product, over a wide range of reaction temperatures.

After the lighter material has been removed, the higher boiling and more viscous polymer fraction may be used as such, with or without some sort of subsequent treatment as has been discussed, or it may be subjected to further fractionation to remove a still higher boiling more viscous fraction. The more viscous fraction so obtained may be removed and discarded, or all or some part or portion of it may be returned to the polymerization system in company with fresh charge stock. Apparently this higher boiling material enters into or effects the reaction so that a higher ultimate yield of the desired polymer fraction can be obtained. Whether this result is obtained by a depolymerization of such material, or by an inhibition of the further formation of similar material, or a combination of such effects is not known.

The hydrogenated polymers resulting from the process are stable hydrocarbons of the branched chain type. As no wax-like material is present in the oil, it has a very low pour point. The viscosity index of the polymer varies with the molecular weight and the molecular structure of the initial material, which can be suitably controlled to produce a product of the desired characteristics. In general, the viscosity index increases with increase in molecular weight of the charge olefin; for example, oils prepared by my process from normal butenes have a viscosity index in the range of about 50 to 80 whereas oils similarly prepared from straight chain octenes have a viscosity index in the range of about 105 to 130. Lubricating range polymers prepared from isobutylene have higher viscosity indices than do similar polymers prepared from normal butenes. On the other hand, with certain higher molecular weight olefins, this result seems to be reversed, as evidenced by the fact that lubricating range polymers produced from di-isobutylene have much lower viscosity indices than similar polymers prepared from less branched octenes, and especially from normal octenes. Also, I have found that lubricating range polymers produced from di-isobutylene have lower viscosity indices than similar polymers produced from isobutylene, either by itself or when undesired polymer fractions formed in the polymerization are recycled with fresh isobutylene.

Lubricating oils so produced form little or no sludge or other insoluble matter on oxidation or decomposition. The absence of residual material resulting from oxidation or cracking, or a combination of the two, is particularly important in oils used to lubricate internal combustion engines. The oils are very resistant to reaction with chemical reagents such as concentrated sulfuric acid and bromine.

In addition to the advantages resulting from the use of zirconium tetrahalides as catalysts in the type of polymerization system herein described, the product from the process is superior to the product from a similar process employing other catalysts, such as aluminum chloride. The products resulting from the polymerization of olefins in this process possess lower temperature coefficients of viscosity, perhaps as a result of the absence of cyclic compounds, as illustrated in the data of Table II.

Table II

| Olefin charge | Viscosity of polymer fraction seconds S. U. V. at 210° F. | Viscosity index of polymer fraction from— | |
|---|---|---|---|
| | | Aluminum chloride polymerization catalyst | Zirconium chloride polymerization catalyst |
| Propylene | 85 | 17 | 42 |
| Do | 150 | 23 | 47 |
| Isobutylene | 50 | 62 | 96 |
| Do | 100 | 62 | 86 |
| Do | 150 | 59 | 80 |
| Do | 200 | 56 | 86 |
| Octene | 100 | 103 | 115 |

The oils prepared in the process herein described contain only hydrocarbons. Their usefulness in particular applications is greatly increased through the incorporation of small amounts of addition agents for specific purposes. Materials to increase oiliness and load-bearing capacity, inhibitors for oxidation, corrosion, and decomposition, and other addition agents may be incorporated in any particular oil, as desired, for use as a lubricant in an internal combustion engine. The addition of anti-oxidants and materials to reduce the catalytic effect of copper and iron is desirable in many applications. Other addition agents may be useful, and will be obvious to one skilled in the art in specific applications.

The following examples are given to illustrate further the application of this process to the preparation of oils.

*Example I*

A C₃ hydrocarbon mixture containing 45 per cent propylene was agitated with zirconium tetrabromide for four hours in a closed vessel at 80° C. (176° F.). Following removal of the catalyst and acidic materials from the mixture, the propane and polymer boiling below 350° C. (662° F.) were distilled from the mixture the final separation being made at reduced pressure. The residual oil, constituting 27 per cent by weight of the propylene charged and comprising an oil of SAE 40 viscosity was hydrogenated. After separation of the propane, the polymer boiling below 350° C. (662° F.) was returned to the polymerization chamber with propylene for further reaction. Employing multiple recycle, approximately 85 per cent ultimate yield of oil of the desired viscosity range is obtained.

*Example II*

A mixture of substantially straight chain hexane and heptane containing no cyclic compounds, such as can be isolated from a paraffinic straight run or natural gasoline, may be catalytically dehydrogenated by treatment with an unglowed, black chromic oxide catalyst. After removal of the products containing five or less carbon atoms, the mixture of six and seven carbon atom hydrocarbons, containing about 12 per cent olefins, is agitated with zirconium tetrachloride at 70° C. (158° F.) for six hours. After removal of the catalyst and acidic materials from the product, the six and seven carbon hydrocarbon fraction, containing substantially only saturated compounds, is removed and returned to the dehydrogenation chamber. The polymer boiling below 360° C. (680° F.) is separated from the product and returned to the polymerization chamber. The residual product is non-destructively hydrogenated. On the basis of the olefin in the charge there is produced 32 per cent of SAE 50 oil, suitable for use as a base stock for an aircraft engine lubricant.

*Example III*

The four-carbon fraction of gases from cracking still may be desulfurized by passage over bauxite catalyst followed by washing with an alkaline solution. The purified and dried butane-butene mixture, containing 16 per cent olefins, and which has also been freed of butadiene, is agitated in liquid phase with 2 per cent zirconium tetrachloride at 85° C. (185° F.) for three hours in a closed vessel at the vapor pressure of the reacting mixture. After removal of the catalyst, and of acidic materials by treatment with bauxite and soda ash, the four-carbon fraction, containing saturated hydrocarbons, is removed from the mixture. The polymer boiling between 100 and 340° C. (212 and 644° F.) is removed and returned to the polymerization chamber. The residual product is hydrogenated, and a good yield of a saturated SAE 40 oil is obtained.

*Example IV*

Isobutane is catalytically dehydrogenated and the materials containing three carbon atoms or less per molecule are separated from the effluent. The C₄ fraction, containing about 22 per cent isobutylene is charged to the polymerization chamber after being freed from traces of butadiene. The charge is agitated in a closed vessel with about 25 per cent zirconium tetrachloride at 60° C. (140° F.) for one hour. Most of the catalyst is then mechanically separated from the product. The acidic materials and alkyl halides are removed by treatment at 220° C. (428° F.) with bauxite and soda ash. The isobutane is then distilled from the mixture and returned to be used as charge stock for dehydrogenation. The polymer boiling between 100 and 345° C. (212 and 653° F.) is separated by distillation at reduced pressure and is returned to the polymerization chamber for further polymerization. The polymer boiling at 345 to 460° C. (653 to 860° F.) (corrected), which represented 25 per cent of the polymer, is distilled at very low pressure, and is subsequently hydrogenated using hydrogen produced by the dehydrogenation. The oil of SAE 20 viscosity so produced is employed as a base stock for preparation of a non-sludging lubricant for internal combustion engines. The viscous residue is also returned to the polymerization, where sufficient of it reacts with isobutylene to prevent increase in the proportion of viscous oil in the system. An ultimate yield of 82 per cent, based on the weight of isobutylene charged, is obtained in this system.

These examples are not necessarily to be construed as limiting the scope or nature of this invention. Various modifications may be readily made by one skilled in the art. Also, optimum specific conditions for the application of my invention in any particular case with any particular charge stock may be readily determined by trial by one skilled in the art, in the light of the present disclosure and discussion. The drawing is, of course, diagrammatic, and the application of my invention on a commercial scale necessitates the use of much equipment such as pumps, heaters, coolers, fractionators, and the like, not shown in detail, but which may be readily applied and adapted for any particular installation by one skilled in the art. The general process and possible material flows have been disclosed and discussed sufficiently to serve as an efficient guide for such purposes.

I claim as my invention:

1. An improved process for the production of a viscous hydrocarbon oil of great stability and high viscosity index, comprising contacting a liquid aliphatic hydrocarbon mixture containing a low-boiling olefin of at least three carbon atoms per molecule unassociated with nonolefin reactive material with a zirconium tetrahalide catalyst as the sole polymerization agent at a polymerization temperature between about 40 and about 80° C., correlating and controlling said polymerization temperature to produce at least about 20 per cent of an intermediate molecular weight polymer fraction having a viscosity at 130° F. between 90 and 300 seconds Saybolt and a high viscosity index, and separating from effluents of said polymerization an intermediate polymer fraction within said viscosity range so produced and comprising at least about 20 per cent of the total polymer product.

2. A continuous process for producing in high yields polymers having a viscosity in the range between 90 and 300 seconds Saybolt at 130° F. and a high viscosity index, which comprises polymerizing in liquid phase a low-boiling olefin of at least four carbon atoms per molecule, together with recycle polymers having a viscosity below the lubricating oil range, in the presence of a zirconium tetrahalide as the sole polymerization agent at a polymerization temperature between 40 and 80° C. and such as to produce as at least about 20 per cent of the total polymer product polymers having a high viscosity index and a viscosity in the range between 90 and 300 seconds Saybolt at 130° F., said olefin and said polymer being the sole reactive materials present during said polymerization, separating from effluents of said polymerization a polymer fraction containing polymers in said viscosity range so produced as at least 20 per cent of said effluents, separating also a polymer fraction containing polymers having a lower viscosity, and returning the last said fraction as said recycle polymers to said polymerization together with additional amounts of said low-boiling olefin.

3. An improved process for the production of a viscous hydrocarbon oil of great stability and high viscosity index, comprising contacting a liquid aliphatic hydrocarbon mixture containing a low-boiling olefin of at least three carbon atoms per molecule unassociated with nonolefin reactive material with a zirconium tetrabromide catalyst as the sole polymerization agent at a polymerization temperature between about 40 and about 80° C., correlating and controlling said polymerization temperature to produce at least about 20 per cent of an intermediate molecular weight polymer fraction having a viscosity at 130° F. between 90 and 300 seconds Saybolt and a high viscosity index, and separating from effluents of said polymerization an intermediate polymer fraction within said viscosity range so produced and comprising at least about 20 per cent of the total polymer product.

4. An improved process for the production of a viscous hydrocarbon oil of great stability and high viscosity index, comprising contacting a liquid aliphatic hydrocarbon mixture containing a low-boiling olefin of at least three carbon atoms per molecule unassociated with nonolefin reactive material with a zirconium tetrachloride catalyst as the sole polymerization agent at a polymerization temperature between about 40 and about 80° C., correlating and controlling said polymerization temperature to produce at least about 20 per cent of an intermediate molecular weight polymer fraction having a viscosity at 130° F. between 90 and 300 seconds Saybolt and a high viscosity index, and separating from effluents of said polymerization an intermediate polymer fraction within said viscosity range so produced and comprising at least about 20 per cent of the total polymer product.

5. A continuous process for producing in high yields polymers having a viscosity in the range between 90 and 300 seconds Saybolt at 130° F. and a high viscosity index, which comprises polymerizing in liquid phase a low-boiling olefin of at least four carbon atoms per molecule, together with recycle polymers having a viscosity below the lubricating oil range, in the presence of a zirconium tetrachloride as the sole polymerization agent at a polymerization temperature between 40 and 80° C. and such as to produce as at least about 20 per cent of the total polymer product polymers having a high viscosity index and a viscosity in the range between 90 and 300 seconds Saybolt at 130° F., said olefin and said polymer being the sole reactive materials present during said polymerization, separating from effluents of said polymerization a polymer fraction containing polymers in said viscosity range so produced as at least 20 per cent of said effluents, separating also a polymer fraction containing polymers having a lower viscosity, and returning the last said fraction as said recycle polymers to said polymerization together with additional amounts of said low-boiling olefin.

JAMES A. REID.